United States Patent [19]
Kim et al.

[11] Patent Number: 5,781,254
[45] Date of Patent: Jul. 14, 1998

[54] ACTIVE MATRIX LCD HAVING A NON-CONDUCTIVE LIGHT SHIELD LAYER

[75] Inventors: Jeong Hyun Kim; Chan Hee Hong, both of Kyungki-do, Rep. of Korea

[73] Assignee: LG Electronics Inc., Seoul, Rep. of Korea

[21] Appl. No.: 886,283

[22] Filed: Jul. 3, 1997

Related U.S. Application Data

[63] Continuation of Ser. No. 588,847, Jan. 19, 1996, abandoned.

[30] Foreign Application Priority Data

Aug. 29, 1995 [KR] Rep. of Korea ............... 1995 26998

[51] Int. Cl.⁶ .................... G02F 1/136; G02F 1/1333
[52] U.S. Cl. .................... 349/44; 349/42; 349/110
[58] Field of Search .................... 359/59, 67, 54; 349/42, 43, 44, 110, 143, 111

[56] References Cited

U.S. PATENT DOCUMENTS

| | | | |
|---|---|---|---|
| 4,759,610 | 7/1988 | Yanagisawa | 359/59 |
| 5,121,237 | 6/1992 | Ikeda et al. | 349/110 |
| 5,130,829 | 7/1992 | Shannon | 359/59 |
| 5,153,754 | 10/1992 | Whetten | 359/59 |
| 5,247,194 | 9/1993 | Bae et al. | 257/59 |
| 5,287,206 | 2/1994 | Kanemori et al. | 359/59 |
| 5,327,001 | 7/1994 | Wakai et al. | 359/59 |
| 5,345,324 | 9/1994 | Koseki et al. | 359/67 |
| 5,368,991 | 11/1994 | Uchikawa et al. | 359/67 |
| 5,377,031 | 12/1994 | Vu et al. | 359/67 |
| 5,414,547 | 5/1995 | Matsuo et al. | 359/67 |
| 5,446,562 | 8/1995 | Sato | 349/110 |
| 5,499,123 | 3/1996 | Mikoshiba | 359/67 |
| 5,500,750 | 3/1996 | Kanbe et al. | 359/59 |
| 5,539,551 | 7/1996 | Nomoto et al. | 359/59 |
| 5,708,485 | 1/1998 | Sato et al. | 349/44 |
| 5,708,486 | 1/1998 | Miyawaki et al. | 349/44 |

FOREIGN PATENT DOCUMENTS 60-68325  4/1985  Japan ................... 349/110

OTHER PUBLICATIONS

"Dye Embedded BM Resin and Three Dimensional Picture Element Implemented by BM ON ARRAY Techonology for the First Time", Nikkei Microdevices 1994, pp. 60–62, with translation.

*Primary Examiner*—William L. Sikes
*Assistant Examiner*—Toan Ton
*Attorney, Agent, or Firm*—Finnegan, Henderson, Farabow, Garrett & Dunner, L.L.P.

[57] ABSTRACT

A liquid crystal display having a top plate and a bottom plate. The bottom plate includes a plurality of gate bus lines and a plurality of drain bus line arranged in a matrix on a substrate surface. A plurality of thin film transistors, each including a source, gate and drain, are formed at intersections of the gate and drain bus lines. A black matrix pattern, including a non-conductive black resin, is provided on the gate bus lines, the drain bus lines and the thin film transistors for shielding these elements from light generated by back lighting the display. A protective layer is formed on the black matrix pattern having contact holes for coupling the pixel electrodes to corresponding drain electrodes of the thin film transistors.

13 Claims, 5 Drawing Sheets

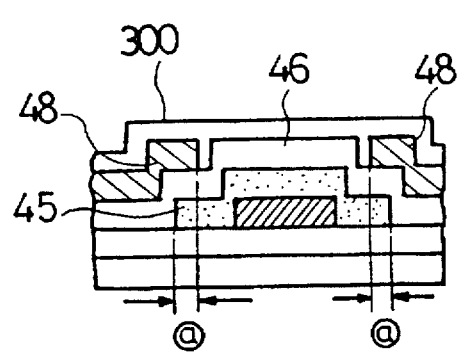 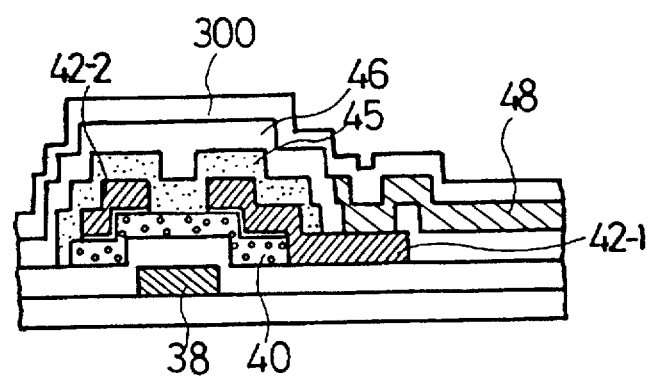

ACTIVE MATRIX LCD HAVING A NON-CONDUCTIVE LIGHT SHIELD LAYER

This application is a continuation of application Ser. No. 08/588,847, filed Jan. 19, 1996, now abandoned.

BACKGROUND OF THE INVENTION

Generally, a thin film transistor liquid crystal display (TFT LCD) includes: a bottom plate with thin film transistors and pixel electrodes arranged thereon; a top plate with color filters and common electrodes arranged thereon for displaying colors; a liquid crystal material injected between the top and bottom plates; and polarizing plates attached on both faces of the two glass plates, for linearly polarizing visible light.

Some light passes through the pixel electrodes and the color filters, while other light is shielded by a black matrix pattern formed on the top plate having the color filters.

Recently, however, it has been proposed to provide the black matrix not on the top plate, but on the bottom plate. In this case, a black matrix pattern is formed by using a pigment dispersing black resin as shown in FIGS. 1A to 1B (FIG. 1A is a plan view of a part of the black matrix, while FIG. 1B is a sectional view taken along a line I—I of FIG. 1A.).

A conventional method for forming the black matrix pattern on the bottom plate will now be described.

First, gate electrode patterns 6 and a gate bus line 7 are formed on a glass plate 5. Simultaneously, an auxiliary capacitor electrode 20, composed of the same material as gate electrode 6, is formed on the edges of a region in which a pixel electrode is formed. This auxiliary capacitor electrode is not only utilized for an auxiliary capacitor, but also serves as a metal wiring for light ray shielding.

Then a gate insulating layer 9 is formed on the entire surface, after which a semiconductor layer is deposited. Then the semiconductor layer is removed, leaving a region where a TFT is to be formed. Thus a semiconductor pattern 10 is formed.

Next, a conductive material is deposited, and then, a source 12, a drain 12' and a data line 13 are patterned. A transparent conductive layer is then deposited and patterned to form a pixel electrode 18 in the pixel region. When forming the source and drain electrodes, an auxiliary capacitor electrode, which is connected to the drain electrode 12', is formed under the pixel electrode region and adjacent to the TFT device region. Accordingly, it not only serves as an auxiliary capacitor electrode 21, but also provides ray shielding.

A protective layer 16 is then selectively provided on glass plate 5, and a black matrix pattern 15 is then formed using a black organic material, i.e., a black resin on a region in which light rays cannot otherwise be shielded by the light ray shielding metal wiring. A hybrid structure is thus formed.

Light rays, irradiated from a back light, are shielded by the light ray shielding metal wirings 20 and 21 and by the black matrix composed of a black organic material. As a result, the light rays pass only through the pixel electrode region.

In the above described technique, a black matrix composed of a black resin is formed on a TFT array, and therefore, the reflection rate is lower than a chrome black matrix. Further, it is non-conductive, and therefore, it is very desirable. However, in order to raise the level of shielding, the resin layer has to be at least 1.5 microns thick.

In this case, a large step at the edge of the resin layer is created, which disturbs the orientation of the liquid crystal.

Further, the black resin is positioned over the protective layer, and therefore, it lies adjacent to the liquid crystal only in a portion overlying the orientation film. Further, the resin contains impurities such as alkaline metals, which can contaminate the liquid crystal, thereby deteriorating picture quality.

SUMMARY OF THE INVENTION

The present invention is intended to overcome the above described disadvantages of the conventional technique.

Therefore it is the object of the present invention to provide a high picture quality liquid crystal display structure and a manufacturing method therefore, in which the opening ratio is increased and total reflection is achieved, with minimal effect on the liquid crystal.

In the present invention, a black matrix is formed on a TFT array using a non-conductive black resin to improve a light ray passing opening. Consequently, the power consumption is saved, and total reflection is achieved which improves the contrast ratio. Further, misalignment is prevented in the coupling of the bottom plate with the top plate, and the process yield is increased.

During the manufacturing of the active matrix liquid crystal display according to the present invention, a black matrix is formed on a TFT array using a black resin on a region other than the pixel regions for passing light rays. Next, at least one or more layers of an intermediate film is formed, and then, a liquid orientation layer is formed thereon. The intermediate film improves the step coverage, and prevents impurity diffusion from the black resin into the liquid crystal. Further, due to this intermediate film, the influence on the orientation of the liquid crystal by the thickness of the black matrix is alleviated, with the result that the picture quality of the display is improved.

The bottom plate of the liquid crystal display according to the present invention includes a substrate having a primary surface; a plurality of gate bus lines and a plurality of data bus lines disposed in a matrix arrangement on said primary surface of said substrate; a plurality of cross points located at respective intersections of said gate bus lines and said data bus lines; a plurality of thin film transistors formed on said primary surface of said substrate, each having a gate electrode, a source electrode, and a drain electrode, each of said plurality of thin film transistors are provided at respective ones of said cross points; a substantially opaque layer formed on said plurality of gate bus lines, said plurality of data bus lines, and on said thin film transistors, said substantially opaque layer shielding said gate bus lines, said plurality of data bus lines, and said thin film transistors from light; a protective layer formed on said substantially opaque layer and having a plurality of contact holes provided in correspondence with said drain electrodes of each of said plurality of thin film transistors; and a plurality of pixel electrodes formed on said primary surface of said substrate coupled to corresponding ones of said drain electrodes via said plurality of contact holes.

The black matrix is preferably patterned such that regions other than the pixel electrodes are shielded from light. Alternatively, it may be overlapped with the pixel electrode region. In addition it may be disposed such that it shields a region other than the pixel electrode region, the TFT region, or the TFT channel region.

Further, an orientation layer is formed on the protective layer and the pixel electrodes.

The black matrix pattern is formed to a thickness of 1.5 microns or less, and it should have a heat resistance up to 260° C., while the light ray transmittance should be 50% or less.

Further in accordance with the present invention, a method for manufacturing a liquid crystal display is provided including the steps of forming a plurality of gate bus lines on a primary surface of a substrate; forming a plurality of drain bus lines on said primary surface of said substrate, each of said plurality of drain bus lines intersecting said plurality of gate bus lines at a plurality of cross points, said drain bus lines and said gate bus lines being arranged in a matrix; forming a plurality of thin film transistors at respective ones of said plurality of cross points, each of said plurality of thin film transistors having a source electrode, a drain electrode and a gate electrode; forming a substantially opaque layer overlying said plurality of gate bus lines, said drain bus lines and said thin film transistors; forming a protective layer on said substantially opaque layer; forming contact holes in said protective layer overlying portions of said drain electrode of each of said plurality of thin film transistors; forming a plurality of pixel electrodes on said primary surface of said substrate; and electrically connecting each of said plurality of pixel electrodes to respective ones of said drain electrodes of each of said plurality of drain electrodes through said contact hole.

BRIEF DESCRIPTION OF THE DRAWINGS

The above object and other advantages of the present invention will become more apparent from the detailed description of the preferred embodiments of the present invention with reference to the attached drawings in which:

FIGS. 5A and 5B are sectional views taken along lines III—III and IV—IV of FIG. 2, respectively, showing orientation layer 300.

DESCRIPTION OF THE PREFERRED EMBODIMENTS

Figure 1A:
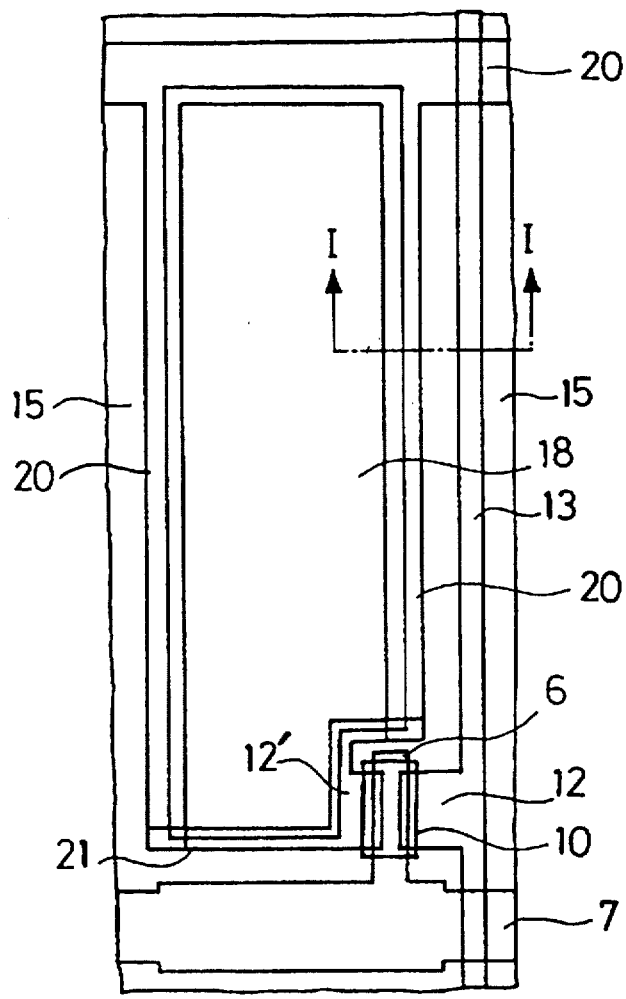
FIG. 1A illustrates a pixel layout including a conventional shielding layer pattern using a black resin.
Figure 1B:
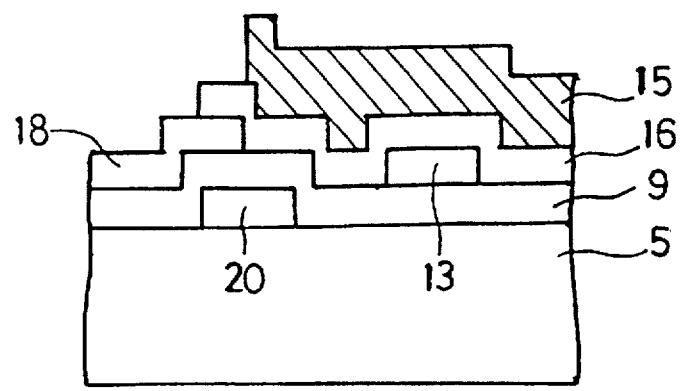
FIG. 1B is a sectional view taken along a line I—I of FIG. 1A.
Figure 2:
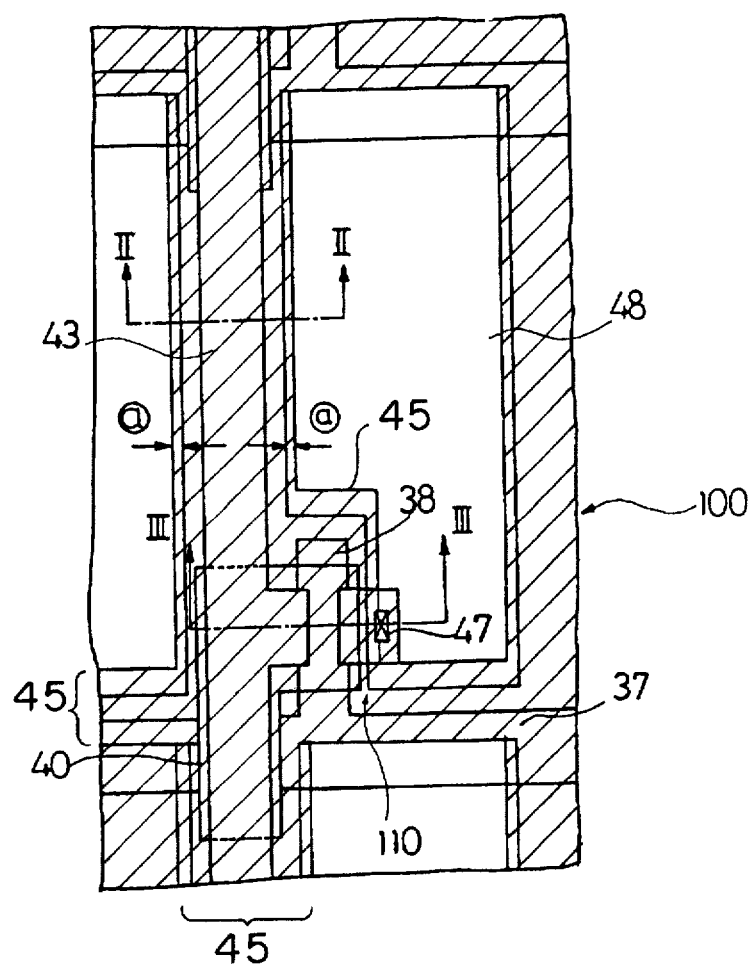
FIG. 2 illustrates a pixel layout according to a preferred embodiment of the present invention.

FIG. 2 illustrates a lay out of a pixel 100 including gate bus line 37 running on one side of pixel electrode 48 perpendicular to data line 43 provided near an adjacent side of pixel electrode 48. A TFT transistor 110 is located in close proximity to the location where the data line 43 crosses gate bus line 37. The TFT 110 includes a gate electrode 38 coupled to gate bus line 37, while the source electrode of the TFT 110 is connected to the data line 43. TFT 110 includes an active layer 40 and a drain electrode coupled to pixel electrode 48 via contact hole 47.

A method for manufacturing the pixel shown in FIG. 2 will now be described with reference to FIGS. 3 and 4, where FIGS. 3A–3H and FIGS. 4A–4H illustrate manufacturing steps at cross-sections taken along lines II—II and III—III, respectively.

Figure 3A:
FIGS. 3A, 3B, 3C, 3D, 3E, 3F, 3G and 3H are sectional views taken along a line III—III of FIG. 2.
Figure 4A:
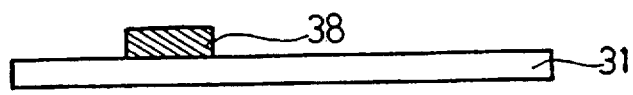
FIGS. 4A, 4B, 4C, 4D, 4E, 4F, 4G and 4H are sectional views taken along a line IV—IV of FIG. 2.

First, as shown in FIGS. 3A and 4A, a first metal layer, preferably comprising chrome, aluminum, or molybdenum is deposited on a transparent substrate 31, and patterned using a photo etching process to form a gate electrode 38 in FIG. 4A and a gate bus line.

Figure 3B:
Figure 4B:
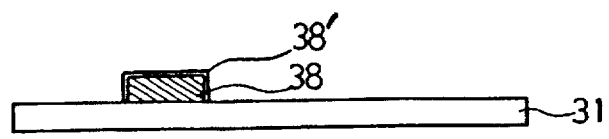

Then as shown in FIGS. 3B and 4B, an anode oxidation is carried out on the surface of gate electrode 38 to form an anode oxidation layer. If the first metal layer comprises aluminum, an aluminum alloy, molybdenum, or a molybdenum alloy, then the anode oxidation process forms an oxide insulating layer 38' in FIG. 4B which is an oxide of these metals. The anodization prevents the formation of hillocks on the surface of gate electrode 38.

Figure 3C:
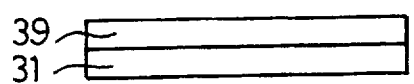
Figure 4C:
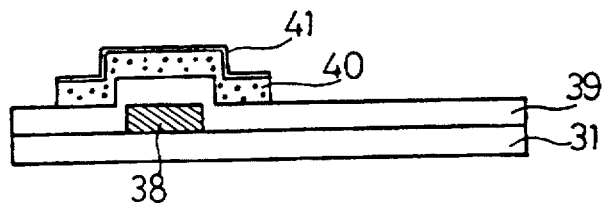

Next, as shown in FIGS. 3C and 4C, an oxide layer (SiOx) or a silicon nitride layer (SiNx) is formed on the entire surface of the substrate, so as to form a single first insulating layer 39. Alternatively, a double-layer insulative may be deposited instead. Then a hydrogenated non-crystalline semiconductor (hydrogenated amorphous silicon; a-Si:H) layer and a doped non-crystalline semiconductor layer are successively stacked on the first insulating layer. Then photo etching and dry etching steps are carried out so as to form patterned non-crystalline semiconductor layer 40 and a doped non-crystalline layer 41 on the gate electrode 38 and on a portion of the substrate corresponding to where the gate bus line and the data bus line will intersect. The doped non-crystalline layer 41 serves as an ohmic contact layer to the source and drain electrodes in the completed device.

Figure 3D:
Figure 4D:
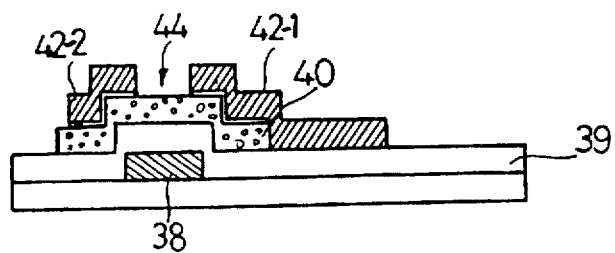

Next, a sputtering apparatus (not shown) is used to deposit a second metal layer (preferably selected from among Al, Cr, Cr/Al, and Cr/Al/Au), and then, as shown in FIGS. 3D and 4D, photo etching and wet etching steps are performed to form a source electrode 42-2, a drain electrode 42-1, and a data line 43 with the same material. Then by using the source and drain electrodes 42-2 and 42-1 as a mask, dry etching is carried out to remove the non-crystalline semiconductor layer which lies between the source electrode and the drain electrode, and overlies part of semiconductor layer 40 which will become a channel region 44 of the completed thin film transistor 110. Thus, the source electrode, the drain electrode and the gate electrode are formed, thereby completing the formation of the thin film transistor.

Figure 3E:
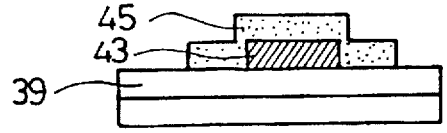
Figure 4E:
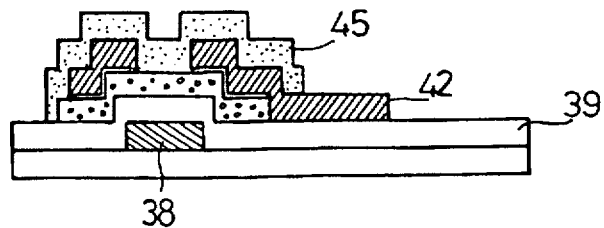

Then as shown in FIGS. 3E and 4E, a substantially opaque layer, preferably a black resin, is coated on the entire surface of the substrate on which the thin film transistors and the data lines have been formed. Exposure and a development steps are next carried out to form a black matrix pattern 45, which prevents light rays from passing between the thin film transistors, the data lines and the pixels. The black resin is preferably formed by dispersing an organic pigment in a highly sensitive negative photoresist resin. For example, the black resin may include a non-conductive, pigment-dispersed, black organic material, which is heat resistant up to 260° C. Further, the light ray transmittance of the black resin is preferably 50% or less, and the coating thickness of the black resin is preferably about 1.5 microns or less. The black resin is used to shield various components from back lighting of the liquid crystal display.

Figure 3F:
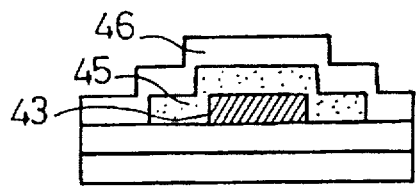
Figure 4F:
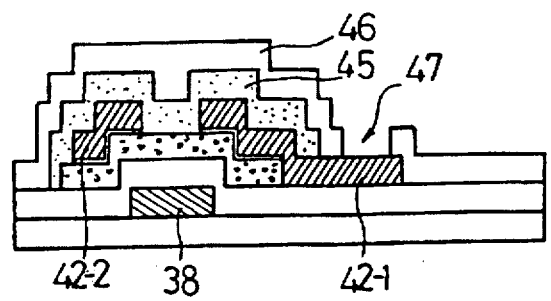

Next, a black matrix pattern is formed on the black resin layer, and then, as shown in FIGS. 3F and 4F, a sputtering apparatus (not shown) is used to deposit a protective layer ($SiO_2$, or silicon nitride layer) 46 for protecting the TFT array. The protective layer 46 is then patterned, and a contact hole 47 is either dry or wet etched, so that the drain electrode can be connected to each pixel electrode.

Figure 3G:
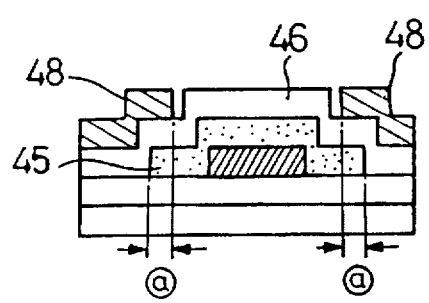
Figure 4G:
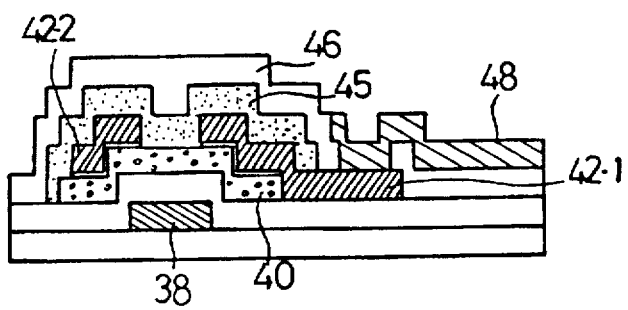

Then as shown in FIGS. 3G and 4G, a transparent conductive layer is formed on the entire surface, and patterned to form a pixel electrode 48. Thus, as shown in FIG. 2, a portion (a) of the black matrix pattern overlaps the pixel electrode.

The LCD display is then completed using conventional fabrication steps. That is, an orientation layer 300 is formed (see FIGS. 5(a) and (b)), and the liquid crystal is sealed.

Figure 3H:
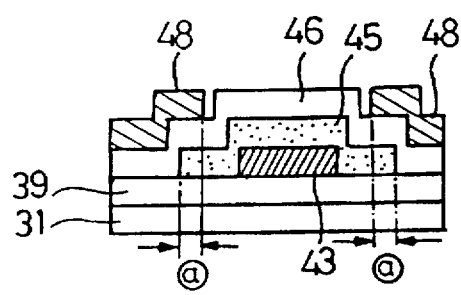
Figure 4H:
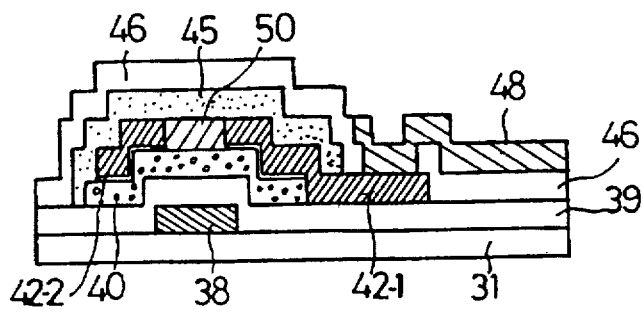

FIGS. 3H and 4H illustrate a second embodiment of the present invention.

In this second embodiment, the process steps up to FIGS. 3D and 4D are carried out in the same way as that of the first embodiment. Then an inorganic insulating layer is deposited, and etched to leave a portion 50 overlying the channel region only. Thereafter, the process steps are carried out in the same manner as that of the first embodiment.

As described above, the black resin is removed above the channel region of the transistor, thereby preventing contamination of the channel region with impurities from the black resin.

Alternatively, portions of the black resin overlying the TFT and pixel electrodes can be removed, thereby patterning the black resin.

Further, as shown in FIGS. 3G and 3H, when the pixel electrode 48 is patterned, the edge portion of the pixel electrode 48 is made to overlap with the black matrix pattern 45.

The liquid crystal display according to the present invention includes: a plurality of gate bus lines and data bus lines formed in a matrix form on the substrate 31; a plurality of thin film transistors, each having a gate electrode 38, a source electrode 42-2 and a drain electrode 42-1, are respectively formed at intersection of the gate and data bus lines; a black matrix pattern 45 formed on the gate bus lines, on the data bus lines and on the thin film transistors, for shielding light; a protective layer 46 formed on the black matrix pattern to cover it; and a plurality of pixel electrodes 48 connected through contact holes to corresponding drain electrodes.

According to the present invention as described above, the black matrix pattern can shield regions other than the pixel electrode region. Further, the protective layer can be disposed on the entire surface, and, therefore, contamination of the liquid crystal by impurities from the black matrix pattern (made of an organic black resin) can be prevented.

Further, since the black matrix is formed on the TFT array, the deterioration of picture quality due to the light ray reflection from the surface of the display can be prevented. In addition, contrast is improved, and a misalignment during the coupling of the top plate can be prevented. Accordingly, the process steps can be easily carried out, and that the production yield can be increased.

Moreover, since the black matrix is formed on the TFT array, the opening ratio of the TFT array is improved, so that power consumption can be reduced, and the picture quality can be improved.

What is claimed is:

1. A liquid crystal display device comprising:
   a substrate having a primary surface;
   a plurality of gate bus lines and a plurality of data bus lines disposed in a matrix arrangement on said primary surface of said substrate;
   a plurality of thin film transistors formed on said primary surface of said substrate, each having a gate electrode, a source electrode, and a drain electrode, said plurality of thin film transistors being respectively provided at intersections of said gate bus lines and said data bus lines;
   a opaque non-conductive layer formed on said plurality of gate bus lines and said plurality of data bus lines, said non-conductive opaque layer shielding said plurality of gate bus lines and said plurality of data bus lines from light;
   a protective layer formed on said opaque non-conductive layer and having a plurality of contact holes provided in correspondence with said drain electrode of each of said plurality of thin film transistors; and
   a plurality of pixel electrodes formed on said primary surface of said substrate and coupled to corresponding ones of said drain electrodes via said plurality of contact holes.

2. A liquid crystal display device in accordance with claim 1, wherein said opaque non-conductive layer constitutes a black matrix pattern.

3. A liquid crystal display device in accordance with claim 1, wherein said opaque non-conductive layer covers portions of said primary surface of said substrate except portions of said primary surface of said substrate corresponding to said plurality of pixel electrodes.

4. A liquid crystal display device in accordance with claim 1, wherein said opaque non-conductive layer covers regions on said primary surface of said substrate except regions corresponding to said plurality of pixel electrodes.

5. A liquid crystal display device in accordance with claim 1, wherein said opaque non-conductive layer covers regions on said primary surface of said substrate corresponding to first portions of said plurality of pixel electrodes and exposes regions on said primary surface of said substrate corresponding to second portions of said plurality of pixel electrodes.

6. A liquid crystal display device in accordance with claim 1, wherein said gate electrode of each of said plurality of thin film transistors is formed on said substrate, each of said plurality of thin film transistors further comprising:
   an insulating layer formed on said gate electrode;
   a semiconductor layer formed on said insulating layer;
   an ohmic contact layer formed on said semiconductor layer, wherein said source electrode and said drain electrode of each of said plurality of thin film transistors is provided on said semiconductor layer.

7. A liquid crystal display device in accordance with claim 1, wherein said opaque non-conductive layer includes an organic black resin.

8. A liquid crystal display device in accordance with claim 6, wherein said opaque non-conductive layer has a width greater than a width of each of said plurality of data bus lines.

9. A liquid crystal display device in accordance with claim 6, wherein said opaque non-conductive layer has a thickness of 1.5 microns and is substantially heat resistant to a temperature from 0° C. to about 260° C.

10. A liquid crystal display device in accordance with claim 6, wherein each of said thin film transistors further comprises a channel region provided between said source electrode and said drain electrode, a portion of said opaque non-conductive layer being removed adjacent said channel region of each of said thin film transistors.

11. A liquid crystal display device in accordance with claim 1, wherein each of said thin film transistors further comprises a channel region provided between said source electrode and said drain electrode, said liquid crystal display device further comprising an inorganic insulating layer provided overlying said channel region.

12. A liquid crystal display device in accordance with claim 1, wherein said protecting layer is formed on said opaque non-conductive layer and includes at least one inorganic insulating layer.

13. A liquid crystal display device in accordance with claim 1, wherein said opaque non-conductive layer covers regions on said primary surface of said substrate other than regions corresponding to said plurality of pixel electrodes and said plurality of thin film transistors.

* * * * *